United States Patent [19]

Weiss

[11] 4,216,988
[45] Aug. 12, 1980

[54] VEHICLE BODY HAVING PIVOTABLE SIDE WALLS

[75] Inventor: Robert L. Weiss, West Lawn, Pa.

[73] Assignee: Reading Body Works, Inc., Reading, Pa.

[21] Appl. No.: 955,080

[22] Filed: Oct. 26, 1978

[51] Int. Cl.² .............................................. B60P 7/06
[52] U.S. Cl. ................................... 296/43; 296/10
[58] Field of Search .......................... 296/10, 27, 43; 280/651

[56] References Cited

U.S. PATENT DOCUMENTS

| 1,893,532 | 1/1933 | Ball | 296/10 |
| 3,266,836 | 8/1966 | Taylor | 296/10 |

Primary Examiner—Robert R. Song
Attorney, Agent, or Firm—Seidel, Gonda, Goldhammer & Panitch

[57] ABSTRACT

Vertically disposed side walls on a vehicle body are completely removable or are pivotable outwardly through an arc of at least 90° and not more than about 180° to facilitate loading and unloading of the vehicle body.

9 Claims, 7 Drawing Figures

VEHICLE BODY HAVING PIVOTABLE SIDE WALLS

BACKGROUND

Truck bodies having side walls which may pivot outwardly are known. For example, see U.S. Pat. No. 1,893,532. Vehicles having stake bodies with removable side walls of the stake type are known and have been sold commercially for a substantial period of time. For example, reference is made to stake body trucks sold by Reading Body Works, Inc. of Reading, Pa. In a stake body truck, the side walls have metal posts which extend downwardly from the lower edge of the side walls into pockets secured to the inner surface of the outboard side rails.

The problem solved is how to construct a stake body having all of the features of a stake body while at the same time having side walls which can pivot in an outward direction through an arc of least 90° and not more than about 180° in a manner which minimizes structural changes in the stake body truck and without increasing the width of the truck body by any significant amount.

SUMMARY OF THE INVENTION

The present invention is directed to a vehicle body having a floor supported by a chassis running gear and vertically disposed side walls. The present invention includes means for supporting the side walls for pivotable movement about horizontal axes so that said walls may pivot outwardly through an arc of more than 90° and not more than about 180°. Such means includes pockets adjacent the periphery of the floor but inwardly of the outboard side rails. The walls have first and second portions. A wall first portion is disposed in one of said pockets and is pivotably connected by a hinge to the second portion of the side wall thereabove. Each hinge is on an outer face of the wall portions adjacent the upper edge of the outboard side rail.

It is object of the present invention to provide a vehicle body wherein side walls are of the stake type and yet can pivot outwardly through an arc of about 180°, while minimizing changes in the construction and/or width of the stake body.

It is another object of the present invention to provide a vehicle body with side walls and/or rear walls which pivot outwardly through an arc of at least 90° and not more than about 180° in a manner which is easy to construct, inexpensive and reliable.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
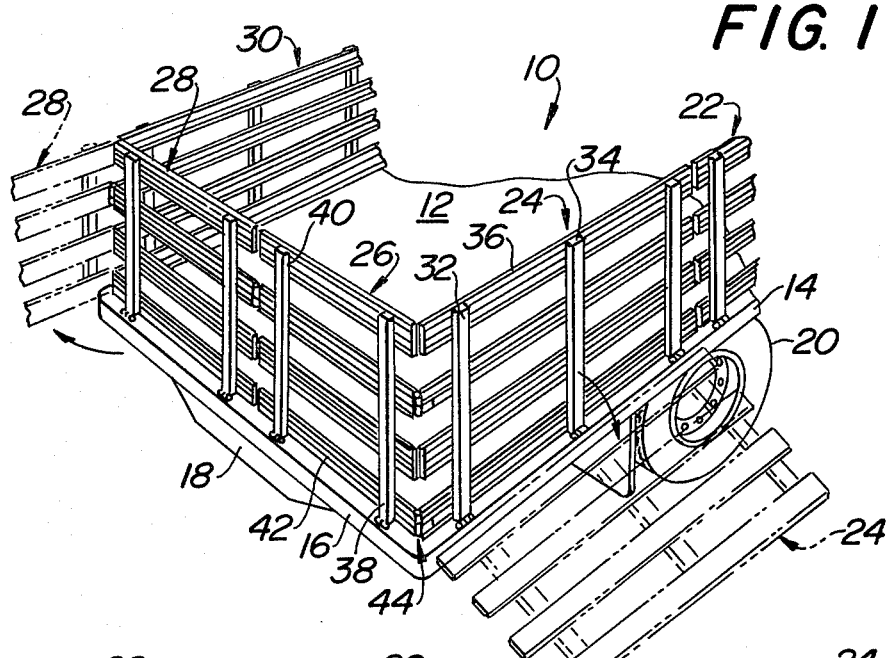
FIG. 1 is a perspective view of the rear end of a stake body truck.
Figure 2:
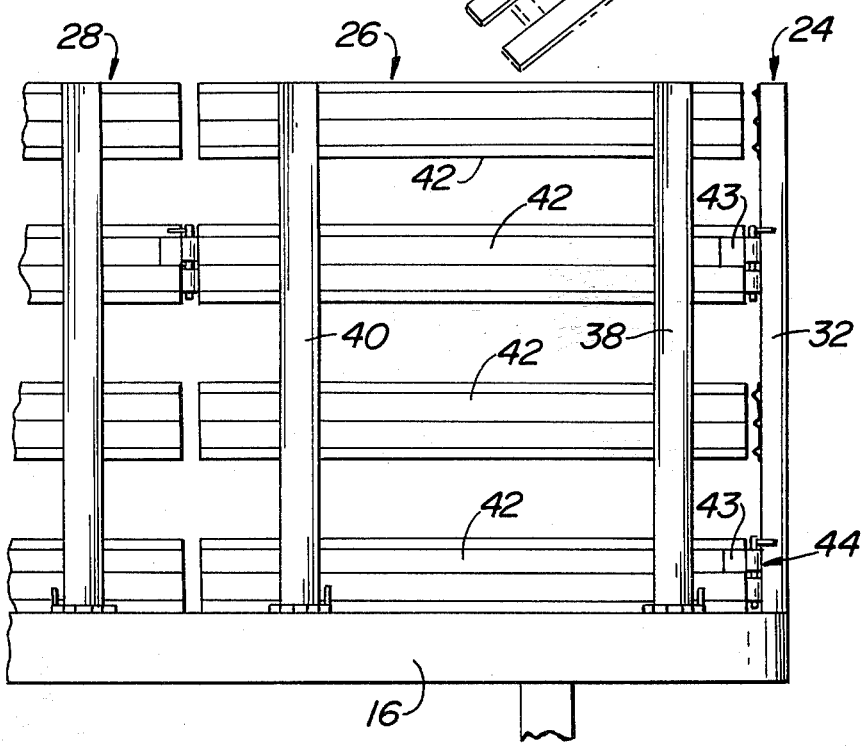
FIG. 2 is a side elevation view of the rear end of the truck shown in FIG. 1.

Referring to the drawings in detail, wherein like numerals indicate like elements, there is shown in FIG. 1 a body 10 of a truck such as a stake body truck. The present invention is equally applicable to trucks of other types such as trucks having contractor bodies wherein the side walls do not have spaced slats defining openings in the wall.

The truck body 10 includes a floor 12 which may be supported at its periphery by a flange on outboard side rails 14 (only one shown) and the rear rail 16. The body is supported on a chassis 18 which includes wheeled running gear such as wheels 20. On one side of the body, there is provided side wall members 22 and 24 which are hinged together for pivotable movement about a vertical axis. Side wall member 24 is similarly hinged to rear wall member 26. Member 26 is similarly hinged to rear wall member 28. Rear wall member 28 is similarly hinged to a side wall member 30 on the opposite side of the body from members 22, 24.

Each of the wall members 26, 28 is pivotably connected to the next adjacent wall member for pivotable movement about a vertical axis. Also, each of the wall members is pivotably connected in a manner so that it may pivot outwardly about a horizontal axis. Since each of the wall members is identical, the following description will be directed primarily to wall members 24 and 26.

The wall member 24 includes a pair of spaced parallel posts 32, 34 which are preferably C-shaped in cross-section and made from metal such as steel or aluminum. The posts are interconnected by a panel means such as a plurality of slats 36 by welding or the like. The slats 36 are preferably corrugated as shown more clearly in FIGS. 3-5.

Figure 7:
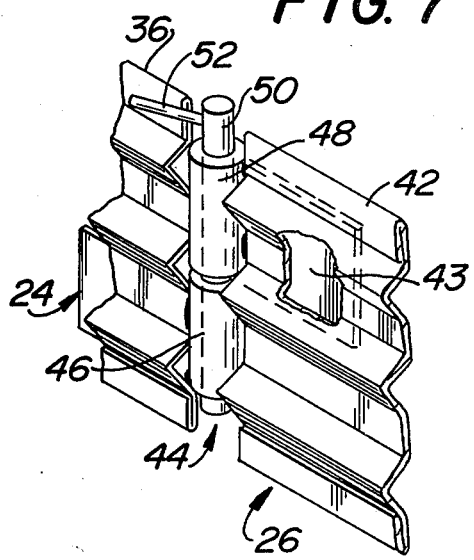
FIG. 7 is a partial perspective view of the interconnection between adjacent side wall portions.
Figure 6:
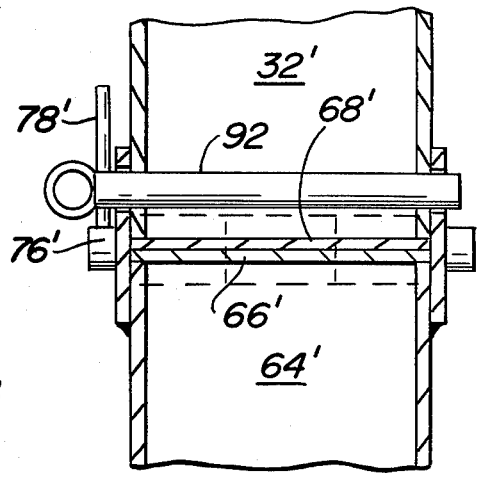
FIG. 6 is a sectional view of another embodiment.

The rear wall member 26 includes spaced parallel posts 38, 40 which are identical with posts 32, 34. The posts 38, 40 are interconnected by slats 42 at spaced points therealong by welding or some other equivalent means. Two of the slats 36 are pivotably connected at one end by way of a hinge 44 to the adjacent end of mating slats 42. The hinge 44 includes a hinge loop 46 welded to one end of the slats 36 and a reinforcement plate 41. A hinge loop 48 is welded to one end of the slats 42 and reinforcement plate 43. See FIG. 7. A pin 50 extends through the aligned loops 46, 48. Pin 50 is preferably provided with a handle 52 so as to be generally L-shaped. Handle 52 facilitates rapid removal of the pin 50. In FIG. 6, the slats 36, 42 are shown in an aligned disposition which occurs when the wall member 26 is pivoted outwardly about a vertical axis so as to form an extension of the side wall member 24. As shown in the drawing, two of the slats 36 are hinged to two of the slats 42.

Each of the side wall members 22, 24, 26, 28 and 30 are hinged in a manner so that they pivot outwardly from an upright disposition through an arc of at least 90° and not more than about 180° to another upright disposition to facilitate loading and unloading of the body 10. Since all of the posts are hinged in a similar manner, only the hinging arrangement for post 32 will be described in detail.

Figure 3:
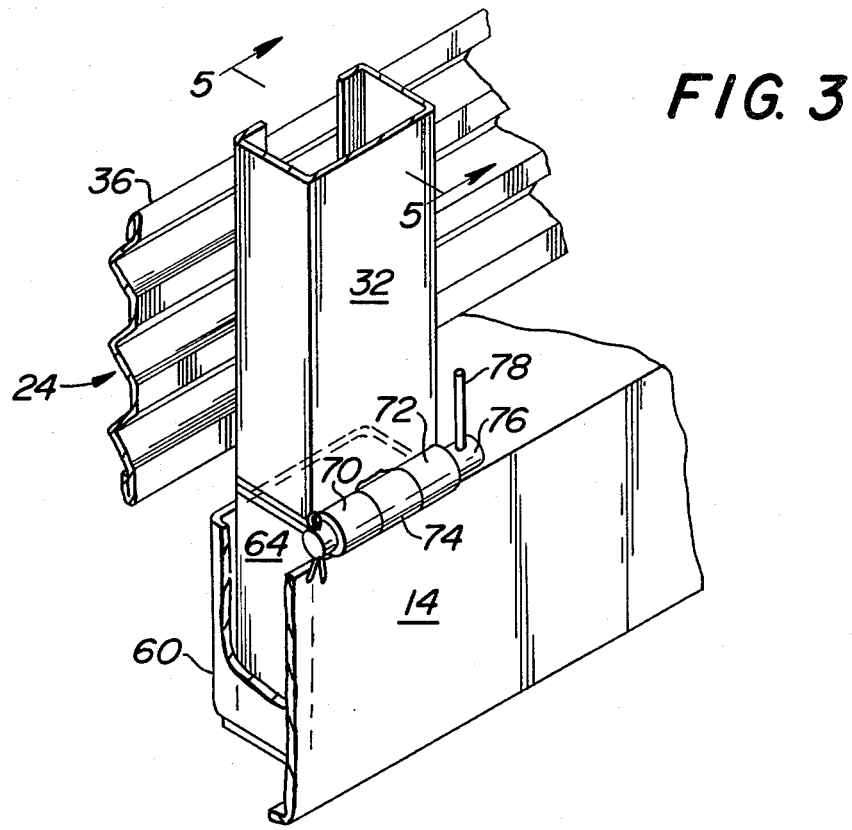
FIG. 3 is a partial perspective view of the interconnection of the stake side wall and outboard side rail on an enlarged scale and with the side wall in an operative vertical disposition.
Figure 4:
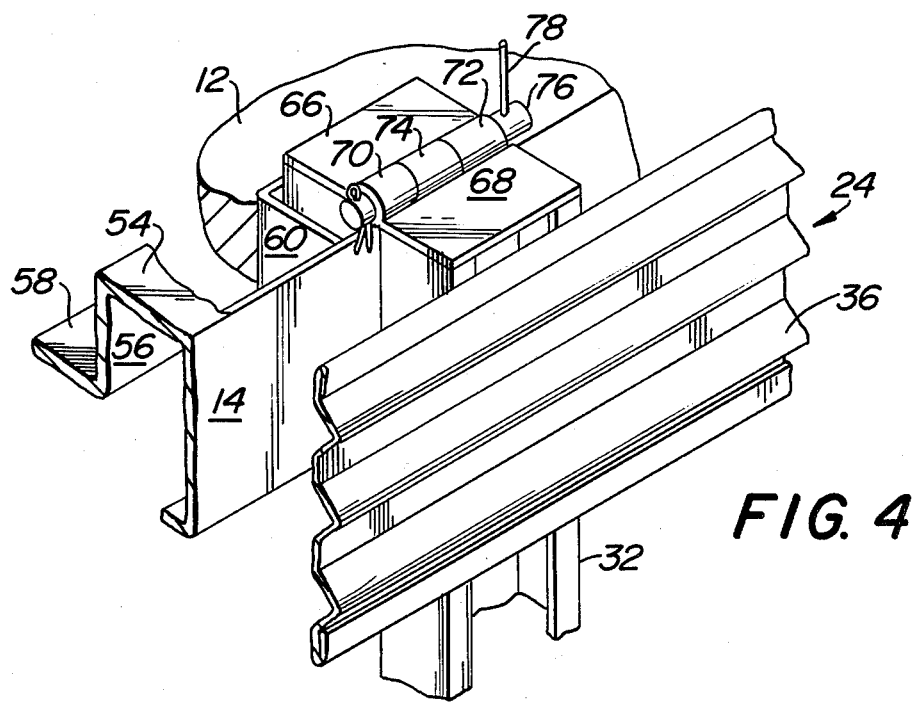
FIG. 4 is a view similar to FIG. 3 but showing the side rail in a down or loading position.
Figure 5:
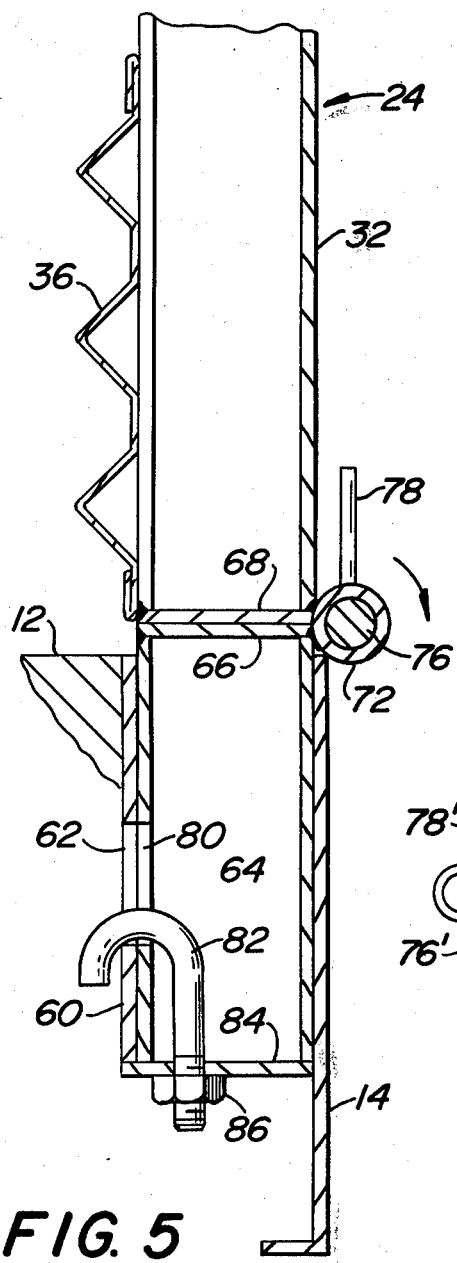
FIG. 5 is a vertical sectional view taken along the line 5—5 in FIG. 3 but on an enlarged scale.

Referring to FIG. 4, a preferred form of the side rail 14 includes a horizontally disposed flange 54 at the upper edge and extending inwardly. The inner end of flange 54 is integral with and connected to a downwardly extending flange 56 which terminates in a horizontally disposed flange 58. Flange 58 supports the periphery of the floor 12. At spaced points therealong, the flange 54 is provided with cut-out holes for receiving a pocket 60 open at each end. Pocket 60 is a U-shaped channel member welded at its free edges to the inner surface of the side rail 14. Pocket 60 at its upper end is flush with the floor 12. See FIGS. 3, 4 and 5.

On the inner wall of the pocket 60 which is parallel to the side rail 14, there is provided a vertically elongated hole 62. The side wall member 24 includes a first portion disposed within the pocket 60. The first portion is a tube 64 rectangular in cross-section and open at its lower end. The tube 64 has peripheral dimensions corresponding generally to the inner peripheral dimensions of the pocket 60. The upper end of tube 64 is preferably closed by a plate 66. The lower end of post 32 is preferably closed by a plate 68. Tube 64 and post 32 have the same peripheral transverse dimensions and are aligned with one another.

The upper end of tube 64 is welded to a pair of spaced hinge loops 70, 72. The lower end of post 32 on its outer face is welded to a hinge loop 74. The loops 70, 72 and 74 are aligned with one another. A pin 76 extends through the aligned loops 70, 72 and 74. Pin 76 has a handle 78 at one end and is retained in position in any suitable manner such as by way of a cotter pin as shown in FIGS. 3 and 4. Handle 78 facilitates rapid removal of pin 76. The plates 66, 68 constitute limit stops and contact one another when the post 32 is upright in an operative disposition.

If desired, the tube 64 and therefore the entire side rail member 24 may be anchored to the truck body in a releasable manner. See FIG. 5. The tube 64 has a hole 80 which is elongated and of the same size as hole 62. A J-bolt 82 extends through the aligned holes 62, 80 and downwardly through a hole in a removable bottom plate 84. A nut 86 is threaded to an exposed portion of the bolt 82 below the plate 84.

The connection between the juxtaposed ends of aligned side wall members 22, 24 provides sufficient rigidity so as to prevent swaying of the side wall members. If additional rigidity is desired, tube 64 and post 32 may be rigified in the manner shown in FIG. 6 wherein corresponding structure is provided with corresponding primed numerals. Side plates 88, 90 are welded to side faces of the tube 64'. Each of the plates 88, 90 have a hole aligned with a hole in a side wall of the post 32'. A pin 92 extends through the aligned holes in the plates 88, 90 and the side walls of the post 32'. Pin 92 may have a loop at one end and may be provided with a cotter pin, bolt or some other equivalent structure at its other end.

As described above, each of the side wall portions has a first portion disposed within a pocket and pivotably connected to another portion thereabove. All of the hinged pins have handles so that they may be readily removed whereby the side wall and real wall members may be readily converted for pivotable movement about a vertical axis or a horizontal axis. The upper end of each pocket 60 is flush with the floor 12 and the flange 54 on the side and rear rails. The body 10 may be used with conventional stake side walls or with the side walls of the present invention as described above and illustrated in the drawings. Hence, a conventional truck body may be converted to the present invention merely by substituting the side wall and rear wall members described above for the corresponding members on a conventional truck body. The hinge loops 70, 72 contact the upper edge of the side rail 14 and act as a limit stop for the extent to which tube 64 may extend into the pocket 60.

The present invention may be embodied in other specific forms without departing from the spirit or essential attributes thereof and, accordingly, reference should be made to the appended claims, rather than to the foregoing specification, as indicating the scope of the invention.

I claim:

1. A vehicle body having a floor supported by a chassis and wheeled running gear, said body having vertically disposed walls, means supporting said walls for pivotable movement about horizontal axes so that the walls pivot outwardly through an arc of more than 90 degrees and not more than 180 degrees, said means including pockets on the upper surface of the floor adjacent the periphery of the floor but inwardly of an outboard rail, said walls having first and second upright portions, a first portion of each wall being in one of said pockets and being pivotably connected by a hinge to the second portion of the associated wall thereabove, each of said hinges being on an outerface of said wall portions adjacent the upper edge of the outboard rail.

2. A vehicle body in accordance with claim 1 wherein said walls include at least two wall members on the rear of said truck body, each rear wall member having spaced parallel slats attached thereto, each rear wall member being hinged for pivotable movement about a vertical axis by way of hinge means interconnecting adjacent ends of slats on adjacent side wall members.

3. A vehicle body in accordance with claim 2 wherein said first portion disposed within said pocket is rectangular in transverse cross-section and hinged to a vertical post of similar cross-section, said vertical post being part of said second portion of a side wall member, each side wall member having at least two posts interconnected by slat means on the inner surface of the post.

4. A vehicle body in accordance with claim 1 wherein said first portion disposed within said pocket is closed at its upper end, said second portion having a post aligned with and of substantially the same cross-section as said first portion, said post being above said first portion and being closed at its bottom end.

5. A vehicle body in accordance with claim 1 wherein said hinge includes a removable L-shaped pin extending through at least two loops, one of the loops being fixedly secured to said first portion and the other loop being fixedly secured to said second portion.

6. A vehicle body in accordance with claim 1 wherein said walls include horizontally disposed slat means extending transversely across and secured to one of said first portions, hinge means on the ends of said slat means to facilitate hinging said walls to an adjacent wall.

7. A truck body having a floor and a vertically disposed wall along an edge of said floor, said vertically disposed wall extending upwardly from the floor and including two wall members, hinge means pivotably interconnecting adjacent ends of said wall members for pivotable movement about a vertical axis, said hinge means including a removable pin, said floor including upright pockets in the top surface thereof adjacent the floor periphery (thereof), each wall member including a first (member) portion disposed within one of said pockets and pivotably connected to another portion aligned therewith and disposed thereabove by way of a horizontally disposed releasable hinge means located adjacent the upper end of the pocket.

8. A vehicle body having a floor supported by a chassis and wheeled running gear, said body having vertically disposed walls, means supporting said walls for pivotable movement about horizontal axes so that the walls pivot outwardly through an arc of more than 90° and not more than 180°, said means including pockets adjacent the periphery of said floor but inwardly of an outboard rail, said walls having first and second portions, a first portion of each wall being in one of said pockets and being pivotably connected by a hinge to the second portion of the associated wall thereabove, each of said hinges being on an outer face of said wall portions adjacent the upper edge of the outboard rail, each hinge including a removable L-shaped pin extending through at least two loops, one of the loops being fixedly secured to said first portion and the other loop being fixedly secured to its associated post, each first portion disposed within one of said pockets being rectangular in transverse cross-section and hinged to a vertical post of similar cross-section, each vertical post being part of said second portion of a wall, each wall having at least two posts interconnected by panel means on the inner surface of the posts.

9. A vehicle body in accordance with claim 8 wherein each first portion disposed within a pocket is closed at its upper end.

* * * * *